Aug. 25, 1936.      C. C. FARMER      2,052,171
FLUID PRESSURE BRAKE
Filed May 13, 1932
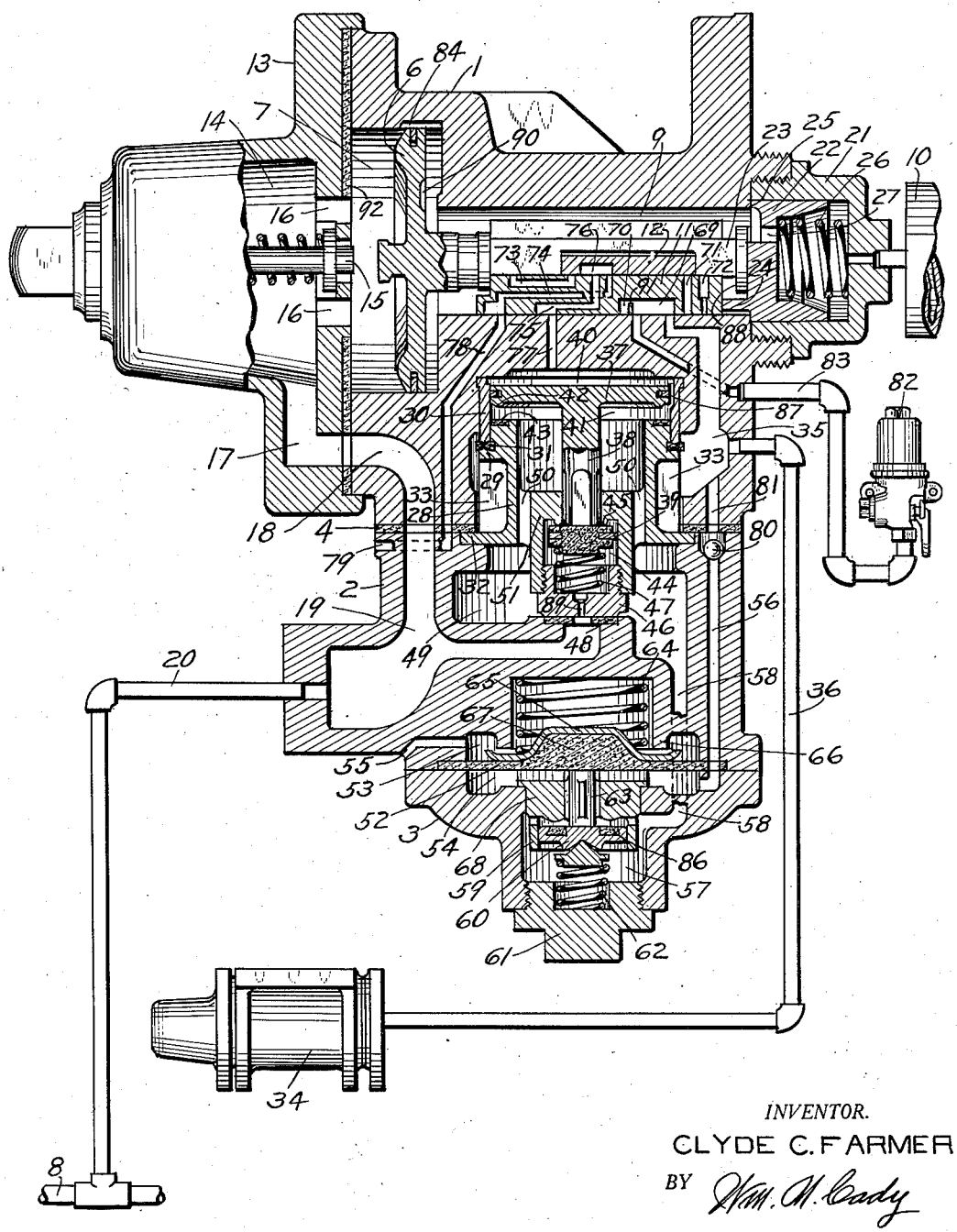
INVENTOR.
CLYDE C. FARMER
BY *Wm. N. Cady*
ATTORNEY.

Patented Aug. 25, 1936

2,052,171

UNITED STATES PATENT OFFICE 2,052,171

FLUID PRESSURE BRAKE

Clyde C. Farmer, Pittsburgh, Pa., assignor to The Westinghouse Air Brake Company, Wilmerding, Pa., a corporation of Pennsylvania Application May 13, 1932, Serial No. 611,010

16 Claims. (Cl. 303—39)

This invention relates to fluid pressure brakes, and more particularly to the type which operates according to variations in brake pipe pressure to control the application and the release of the brakes and which, in effecting an application of the brakes, functions to vent fluid under pressure from the brake pipe to propagate quick service action through a train.

In the pending application of Glenn T. McClure, Serial No. 580,358, filed December 11, 1931, a brake controlling valve device is disclosed in which a light reduction in brake pipe pressure is adapted to move a piston and graduating valve to a quick service position, such movement being relative to a main valve which carries the graduating valve. In the quick service position, a communication is established through which fluid under pressure is vented from the brake pipe to the brake cylinder to effect a local quick service reduction in brake pipe pressure, the degree of said reduction being controlled by a quick service modifying valve device which is operative upon a predetermined increase in brake cylinder pressure to close the above mentioned communication.

The control of the quick service venting of fluid from the brake pipe through the graduating valve to the brake cylinder and the means for limiting the degree of said venting, as above described, is considered an improvement over the conventional type of quick service employed in the usual K triple valve which is at present employed on cars in freight service.

In the K triple valve it is necessary that the piston first move the graduating valve relative to the main valve and then move the main valve to a position in which the usual service port is partly opened before establishing the communication through which the quick service venting of fluid under pressure from the brake pipe to the brake cylinder is permitted to occur. This quick service venting of fluid from the brake pipe being thus delayed until sufficient reduction in brake pipe pressure is obtained for the triple valve piston to move the main slide valve, delays the serial propagation of quick service operation through a train, as compared to a device of the character disclosed in the above mentioned pending application.

The principal object of my invention is to modify the K type of triple valve so as to include therein a quick service feature of a type similar to that described in the above mentioned pending application.

Other objects and advantages will appear in the following, more detailed description of my invention.

In the accompanying drawing, the single figure is a diagrammatic view of a fluid pressure brake equipment including a modified K type of triple valve device embodying my invention.

As shown in the drawing, the modified K triple valve comprises a casing consisting of the usual K triple valve body portion 1, to which, according to my invention, is secured a casing section 2, a gasket 4 being interposed between the body portion 1 and said casing section, while secured to the casing section 2 is a cover plate 3 of a quick service modifying valve device.

The triple valve body portion 1 contains the usual piston 6 having at one side a chamber 7 connected to the brake pipe 8 and at the opposite side a valve chamber 9 connected to the auxiliary reservoir 10, said valve chamber containing a main slide valve 11 and an auxiliary slide valve 12 adapted to be operated by piston 6.

The open end of piston chamber 7 is closed by the usual cylinder cover 13 having a chamber 14 containing the usual spring pressed piston stop 15 and open to piston chamber 7 through a plurality of apertures 16. The chamber 14 is connected by a passage 17 to a passage 18 in the triple valve body, passage 18 registering with a passage 19 provided in the casing section 2 and connected to pipe 20 leading to the brake pipe 8.

The outer end of valve chamber 9 is provided with the usual retarded release mechanism retained in place by a member 21 having screwthreaded engagement with the casing and through which communication is established from valve chamber 9 to auxiliary reservoir 10.

The retarded release mechanism comprises a movable abutment 22 adapted to engage the end of stem 23 carried by piston 6, said abutment being provided with a finger 24 adapted to engage the main slide valve 9 at substantially the same time as the end of piston stem 23 is engaged by the abutment 22. A shoulder 25 is formed in the casing for defining the normal position of abutment 22, said abutment being urged to said position by means of a spring 26. The abutment 22 is provided with a through port 27 for establishing unrestricted communication between the auxiliary reservoir 10 and valve chamber 9.

In modifying the K triple valve device to accomplish the invention, the usual quick action mechanism of said triple valve device is dispensed with and a cage-like member 28 is substituted. The member 28 is provided with an annular rib 29 between which and the end of the usual quick action piston bushing 30 is interposed a gasket 31. The member is also provided with an annular flange 32 adapted to be received in a suitable recess in the face of the casing section 2, so as to effect a leak-proof seal with the gasket 4 when the casing section is secured to the triple valve body. A seal is effected between the rib 29 and bushing 30 by the gasket 31 at the same time as at gasket 4, the purpose being to prevent leakage from the chamber 33, formed between said gaskets and surrounding the member 28, to the chamber at each end of said member, the chamber 33 being at all times in communication with a brake cylinder 34 through a passage 35 and pipe 36.

A quick service piston 37 is movably mounted in the bushing 30 and is provided with a stem 38 adapted to engage a vent valve 39, and through which said vent valve is adapted to be unseated upon movement of said piston.

The piston 37 has at one side a chamber 40 and at the opposite side a chamber 41 and is provided with a seat rib 42 adapted, upon operation of said piston, to effect sealing engagement with a gasket 43 carried in a suitable recess in the upper end face of the member 28.

The vent valve 39 is contained in a chamber 44 formed in the end wall 51 of the member 28. The piston stem 38 slidably extends through a suitable bore in end wall 51 and is adapted to engage the vent valve 39, the outer portion of said stem being fluted for establishing communication from chamber 44 to chamber 41 when the valve 39 is moved away from the seat rib 45 by operation of the piston 37.

The open end of chamber 44 is closed by a plug 46 between which and the vent valve 39 is interposed a light spring 47 for urging said vent valve into engagement with seat rib 45.

The plug 46 is preferably screw-threaded to the cage member 28 and between the outer end of said plug and the casing section 2 is interposed a gasket 48 for preventing leakage of fluid from the brake pipe passage 19 to a chamber 49, the latter chamber being at all times in unrestricted communication with chamber 41 through a plurality of apertures 50 provided in the end wall of member 28. It will be noted that the gasket 48 is compressed to effect a seal in the same manner and at the same time as gaskets 31 and 4 are compressed in securing the casing section 2 to the triple valve body.

The quick service modifying valve device 3 comprises a flexible diaphragm 52 clamped between the casing section 2 and cover plate 3 and forming a chamber 53 at one side and a chamber 54 at the opposite side, chamber 53 being at all times open to the atmosphere through a passage 55, while chamber 54 is connected through a passage 56, past a check valve 80 and through a passage 81 to passage 35 communicating through pipe 36 with the brake cylinder 34. It will be noted that the check valve 80 is contained in a cavity formed in the casing section 2, the open end of said cavity being partly closed by gasket 4 for retaining said check valve in said cavity.

A bushing 68 is pressed into a suitable bore in the casing and separates chamber 54 from a chamber 57, which is connected through passage 58 to chamber 49. The bushing 68 is provided with an annular guide portion 59 in which is slidably mounted a poppet valve 60. The open end of chamber 57 is closed by means of a screw-threaded plug 61 between which and poppet valve 60 is disposed a light spring 62 for urging said poppet valve into engagement with a seat rib 86 formed on the bushing. A fluted operating pin 63 is slidably mounted in a suitable bore through the bushing, one end of said pin engaging the poppet valve 60 while the other end is adapted to be engaged by the diaphragm 52.

Contained in the diaphragm chamber 53 is a spring 64 which is interposed between and engages the casing section 2 and a circular metallic plate 65 carried by the diaphragm 52. This plate is adapted to engage with a stop rib 66 provided on the casing section 2 for limiting deflection of the diaphragm 52 in one direction, while the deflection of said diaphragm in the opposite direction is limited by engagement with the bushing 68.

For maintaining the spring 64 in proper alignment with the diaphragm 52, the diaphragm is provided with a boss 67 over which a recess in the plate 65 is adapted to fit, the projection on the plate, caused by forming the recess, extending inside of the spring. Thus both the spring 64 and plate 65 are secured against lateral displacement.

The main slide valve 11 is provided with the usual full release cavity 69, retarded release cavity 70, service port 71 and emergency port 72. In order, however, to embody my invention, ports 73, 74 and 75 have been added and cavity 76 in the auxiliary slide valve 12 has been added to control communication between said ports as will hereinafter be described.

The usual K triple valve quick service passages 77 and 78 are retained and adapted to register with ports 75 and 74, respectively, in the main slide valve when said slide valve is in the usual full release and retarded release positions, the passage 78 also being connected to an atmospheric passage 79 provided in the casing section 2.

A pressure retaining valve device 82 is connected in the usual manner to the seat of the main slide valve 11 through pipe and passage 83. This device may be of the usual construction, having a cut-in position for restricting the release of fluid under pressure from the brake cylinder and for retaining a predetermined pressure in the brake cylinder, and a cut-out position in which it has no control over the release of fluid under pressure from the brake cylinder.

In operation, fluid under pressure is supplied to brake pipe 8 in the usual manner and flows from thence through pipe 20, passages 19, 18, and 17 to chamber 14 and from chamber 14 through the apertures 16 to piston chamber 7. Assuming the piston 6 and slide valves 11 and 12 to be in the full release position shown in the drawing, fluid under pressure flows from piston chamber 7 through a feed groove 84 to valve chamber 9 and from thence to the auiliary reservoir 10, thereby charging said reservoir to brake pipe pressure.

With the slide valve 11 in the full release position and with the pressure retaining valve device in the cut-out position, the brake cylinder 34 is open to the atmosphere through pipe 36, passage 35, cavity 69 in the slide valve 11, passage and pipe 83 and retaining valve device 82. Diaphragm chamber 54 of the quick service modifying valve device being connected through passage 56, past the check valve 80 and through passage 81 to passage 35, is also open to the atmosphere through the brake cylinder release cavity 69, and this permits spring 64 to hold the diaphragm 52 in engagement with the bushing 68. In this position of the diaphragm 52, the poppet valve 60 is moved out of engagement with the seat rib 86, so as to establish communication between chambers 54 and 57.

The quick service piston chamber 40 is vented to the atmosphere when the slide valve 11 is in full release position by way of passage 77, port 75 in the main slide valve 11, cavity 76 in the auxiliary slide valve 12, port 74 in said main slide valve, passage 78 and atmospheric passage 79. With the quick service piston 37 in the normal position shown in the drawing, a leakage groove 87 connects chamber 41 to chamber 40 and since chamber 49 is connected through apertures 50 to chamber 41, the chambers 41 and 49 are vented to the atmosphere through chamber 40, and the vent valve 39 is pressed into engagement with seat rib 45 by the spring 47.

In order to effect a service application of the brakes, a gradual reduction in brake pipe pressure is effected and a corresponding reduction occurs in piston chamber 7. When the pressure in piston chamber 7 is thus reduced a predetermined degree below auxiliary reservoir pressure acting in valve chamber 10, the piston 6 is operated to move the auxiliary slide valve 12 relative to the main slide valve 11.

The initial movement of piston 6 is adapted to close the feed groove 84, so as to prevent back flow of fluid under pressure from the auxiliary reservoir to the brake pipe. Further movement of said piston then shifts the auxiliary slide valve 12 to quick service position in which the collar 88 on the piston stem 23 engages the end of the main slide valve and on account of the added resistance of the main slide valve to movement, further outward movement of piston 6 temporarily ceases.

In quick service position of the auxiliary slide valve 12, port 74 is lapped and cavity 76 connects port 73 to port 75, and since port 73 is at all times connected to valve chamber 9, fluid at auxiliary reservoir pressure is permitted to flow from valve chamber 9 through port 73 and cavity 76 to port 75 and from thence through passage 77 to the quick service piston chamber 40.

The rate at which fluid under pressure is supplied to the quick service piston chamber 40 exceeds the venting capacity of the leakage groove 87, so that a pressure builds up in said chamber and moves the piston 37 into sealing engagement with gasket 43. This movement of piston 37 pushes the vent valve 39 away from seat rib 45, which permits fluid under pressure to flow from the brake pipe to the brake cylinder through passage 19, choke 89 in plug 46, valve chamber 44, past the vent valve 39 and fluted portion of the quick service piston stem 38 to chamber 41 and from thence through apertures 50, chamber 49, passage 58, quick service modifying valve chamber 57, past the poppet valve 60 and around the stem 63 to chamber 54 and from chamber 54 through passage 56, past the check valve 80, through passage 81, passage 35 and through pipe 36. The rate at which fluid under pressure is thus vented from the brake pipe to the brake cylinder is controlled by the choke 89 and is adapted to locally effect a quick service reduction in brake pipe pressure for causing the triple valve device on the adjacent car to operate in a similar manner and thus cause rapid, serial quick service operation of the triple valve devices throughout the train in the usual well known manner.

The triple valve piston 6 and slide valves 11 and 12 remain in the quick service position until the pressure acting in piston chamber 7 is reduced, in the manner above described, sufficiently below the auxiliary reservoir pressure acting in valve chamber 9, that the pressure differential created on piston 6 can overcome the resistance to movement of the main valve 11 and move said main valve to service position in which the usual service port 71 registers with the brake cylinder passage 35, so that fluid under pressure is supplied from the auxiliary reservoir 10 to the brake cylinder 34 through valve chamber 9, service port 71, passage 35 and pipe 36, thereby applying the brakes.

The movement of the main slide valve 11 to service position cuts off the supply of fluid under pressure to the quick service piston chamber 40 by lapping passage 77, it being evident that fluid supplied to said chamber in quick service position is bottled up in said chamber when the main slide valve is moved to service position. As a consequence, the quick service piston 37 is maintained in engagement with gasket 43, so that the vent valve 39 is held open and fluid under pressure continues to flow from the brake pipe to the brake cylinder at a rate governed by choke 89.

Fluid vented from the brake pipe through chamber 54 of the quick service modifying valve device to the brake cylinder acts on the diaphragm 52, which is subject to the opposing pressure of spring 64. It will be evident that the pressure in chamber 54 increases substantially with brake cylinder pressure and when sufficient pressure is obtained in chamber 54 to overcome spring 64, diaphragm 52 is deflected out of engagement with the bushing 68, such deflection being limited by engagement of plate 65 with rib 66.

The deflection of diaphragm 52 away from bushing 68 permits spring 62 to move valve 60 into engagement with seat rib 86 which closes the communication through which fluid is supplied from the brake pipe to the brake cylinder, after which, fluid under pressure continues to be supplied to the brake cylinder by way of service port 71 in slide valve 11, as hereinbefore described.

It will be seen, that since the quick service modifying valve device is controlled by brake cylinder pressure and operates to close the communication through which fluid is vented from the brake pipe to the brake cylinder when a predetermined brake cylinder pressure, of for instance ten pounds, is obtained, a definite and uniform quick service action is obtained on all cars in the train in the same manner as in the pending application hereinbefore referred to.

When, after effecting a service reduction in brake pipe pressure, the auxiliary reservoir pressure acting in valve chamber 9 is reduced by flow to the brake cylinder to a degree slightly below the reduced brake pipe pressure, the piston 6 is operated and moves the auxiliary slide valve 12 relative to the main slide valve 11 to service lap position in which the service port 71 is lapped, so as to prevent further flow of fluid under pressure to the brake cylinder.

If less than a a full service reduction in brake pipe pressure is effected and the piston 6 and auxiliary slide valve 12 have moved to service lap position, a further gradual reduction in brake pipe pressure will cause said piston and valve to move from service lap position to service position in which fluid under pressure is again supplied to the brake cylinder, so as to increase the brake cylinder pressure, the maximum brake cylinder pressure obtainable upon effecting a full service reduction in brake pipe pressure being equalization of the auxiliary reservoir pressure into the brake cylinder.

After operation of the quick service modifying valve device to cut off the supply of fluid under pressure to the brake cylinder, fluid under pressure continues to flow from the brake pipe through choke 89 and past the vent valve 39 to the quick service piston chamber 41 and from thence to chambers 49 and 57, and when the pressure in said chambers becomes substantially equal to the pressure of fluid in the brake pipe, the differential of pressures acting on the opposite sides of the quick service piston 37 is so reduced that spring 47 moves the valve 39 into engagement with seat rib 45, this movement of valve 39 returning the quick service piston 37 to its normal position in which the leakage groove 87 is open to chamber 41. It will, however, be seen that it is not necessary that the vent valve 39 be seated while effecting an application of the brakes, for the reason that the seating of the quick service modifying valve 60 closes the communication to the brake cylinder and renders the valve 39 ineffective.

If it is desired to effect a release of the brakes after a service application, fluid under pressure is supplied to the brake pipe in the usual manner and the consequent increase in pressure in the triple valve piston chamber 7 moves the triple valve piston 6 and slide valves 11 and 12 to full release position shown in the drawing. At the front of the train where the rate of increase in brake pipe pressure is usually faster than toward the rear of the train, the triple valve piston 6 and slide valves 11 and 12 do not stop moving in full release position, but instead continue to move to retarded release position against the opposing pressure of the retarded release spring 26.

In the full release position of the triple valve parts, the auxiliary reservoir is charged with fluid under pressure from the brake pipe by way of feed groove 84, and fluid under pressure is vented from the brake cylinder 34 to the atmosphere through pipe 36, passage 35, cavity 69 in the main slide valve 11, passage and pipe 83 and through the retaining valve device 82. Since diaphragm chamber 54 of the quick service modifying valve device is at all times connected to the brake cylinder passage 35 through passage 56, past check valve 80 and through passage 81, fluid under pressure is vented from said chamber with the release of fluid from the brake cylinder. When the pressure in chamber 54 is thus reduced to below the pressure of spring 64 acting on the opposite side of diaphragm 52, said diaphragm is deflected to its normal position and unseats the poppet valve 60.

In the retarded release position of the triple valve parts, the piston 6 engages the casing, so that the supply of fluid under pressure from the brake pipe to the auxiliary reservoir is restricted by flowing first through feed groove 84 and then through a feed groove 90 in piston 6 in the usual manner. In the retarded release position of the main slide valve 11, the retarded release cavity 70 registers with the release passage 83, so that the release of fluid under pressure from the brake cylinder and diaphragm chamber 54 of the quick service modifying valve device is restricted by the choked connection 91, connecting the full release cavity 69 to the retarded release cavity 70.

If the triple valve piston 6 and slide valves 11 and 12 are moved to the retarded release position, then when the auxiliary reservoir pressure acting in valve chamber 9 is increased to substantially the pressure carried in the brake pipe and acting in piston chamber 7, the retarded release spring 26, acting through the movable abutment 22 and finger 24, is adapted to move the piston 6 and slide valves to the full release position shown in the drawing.

In both the full release position and retarded release position of the main slide valve 11, fluid under pressure is vented from the quick service piston chamber 40 through passage 77, port 75 in said slide valve, cavity 76 in the auxiliary slide valve 12, port 74, passage 78 and atmospheric passage 79, and since chamber 41 and the connected chamber 49 communicate through the leakage groove 87 with chamber 40, fluid under pressure is vented from chambers 41 and 49.

It is desirable to thus vent the quick service piston chamber 40 and chambers 41 and 49 in the retarded release position of the main slide valve, so that if for any reason the triple valve parts fail to move from the retarded release position to the full release position, quick service operation will be obtained upon a subsequent application of the brakes.

If it is desired to effect an emergency application of the brakes, a sudden reduction in brake pipe pressure is effected. This permits auxiliary reservoir pressure in valve chamber 9 to move the triple valve parts to emergency position in which piston 6 engages gasket 92 and emergency port 72 registers with the brake cylinder passage 35 for supplying fluid under pressure from the auxiliary reservoir 10 to the brake cylinder 34 for applying the brakes.

The movement of the triple valve parts to emergency position is rapid, so that little or no fluid under pressure is supplied to the quick service piston chamber 40. If for any reason sufficient fluid is supplied to chamber 40 to operate the quick service parts, fluid under pressure may be vented from the brake pipe to the brake cylinder, but this is not necessary in effecting an emergency application of the brakes for the reason that the emergency action will be serially propagated through a train by devices not shown in the drawing and not appertaining to the invention.

The check valve 80 functions in effecting an emergency application of the brakes to prevent the undesired loss of brakes by the flow of fluid from the brake cylinder to the brake pipe through passage 56, chamber 54, past the poppet valve 60 to chamber 57 and from thence through passage 58, chamber 49, apertures 50, chamber 41, past the vent valve 39 to chamber 44 and from thence through choke 89 to passage 19 communicating through pipe 20 with the brake pipe 8.

To effect a release of the brakes after an emergency application, the brake pipe is again charged with fluid under pressure, causing the triple valve parts to move either to full release position or retarded release position according to the rate of increase in brake pipe pressure. In both full release position and retarded release position, the auxiliary reservoir 10 is charged with fluid under pressure from the brake pipe, and fluid under pressure is released from the brake cylinder in the same manner as in effecting a release of the brakes after a service application.

If it is desired to retain pressure in the brake cylinder 34, as when operating a train on a descending grade, the retaining valve device is turned to the cut-in position to retain a predetermined pressure in the brake cylinder. Now, when the brake pipe pressure is reduced to effect the first application of brakes on a descending grade, the triple valve parts operate in the same manner as hereinbefore described in connection with effecting a service application of the brakes, to effect a quick service reduction in brake pipe pressure and to supply fluid under pressure to the brake cylinder for applying the brakes. When the brake cylinder pressure increases to substantially ten pounds, the quick service modifying valve device operates, as hereinbefore described, to close off the venting of fluid from the brake pipe. When the brake pipe pressure is increased and the triple valve parts are moved to release position for recharging the auxiliary reservoir 10 with fluid under pressure from the brake pipe, fluid under pressure is vented from the brake cylinder through the retaining valve device which operates to retain a predetermined pressure, such as ten pounds, in the brake cylinder.

With the triple valve parts in the full release position and retarded release position, the quick service piston chamber 40 is vented and chambers 41 and 49 being connected to chamber 40 through the leakage groove 87 are also vented with chamber 40. The venting of chamber 49 reduces the pressure in poppet valve chamber 57, which permits the pressure of fluid in diaphragm chamber 54 to unseat the poppet valve 60 against the opposing pressure of the light spring 62, so that fluid is also vented from chamber 54 and the connected passage 56, the check valve 80 preventing back flow from the brake cylinder to chamber 54. As a result, the diaphragm 52 is deflected by spring 64 and holds the poppet valve 60 unseated, so that in effecting a succeeding application of the brakes, the quick service venting of fluid from the brake pipe will be to chambers 41, 49, 57 and 54, and passage 56 connected to the seat side of the check valve 80. Since the pressure retained in the brake cylinder and holding check valve 80 seated, is substantially the same as required for flexing diaphragm 52 against the opposing pressure of spring 64, there will be no venting of fluid from the brake pipe to the brake cylinder in a succeeding application of the brakes, and since the chamber 54 and passage 56 will be promptly charged to the operating pressure of diaphragm 52, the poppet valve 60 will be seated, so that further quick service venting of fluid from the brake pipe will occur only to chambers 41, 49 and 57. It will thus be evident that the quick service venting of fluid from the brake pipe in succeeding application of the brakes is only to chambers 41, 49, 57, and 54 and such venting is limited by the volume of said chambers and the cutting off of chamber 54 by the quick service modifying valve device, the purpose of this limited quick service reduction in brake pipe pressure being merely to accelerate the movement of the triple valve devices to service position, it not being intended that this quick service reduction shall aid in applying the brakes as in effecting the initial application of the brakes.

From the foregoing description it will be seen that the modified K triple valve operates to locally vent fluid under pressure from the brake pipe to the brake cylinder to effect a quick service reduction in brake pipe pressure, the degree of said reduction being controlled by a quick service modifying valve device, so that the brake cylinder pressure obtained from said local venting will be substantially uniform on all cars of the train.

The subject matter relating to the feature of controlling the quick service flow of fluid from the brake pipe according to a predetermined brake cylinder pressure is broadly claimed in my pending application Serial No. 612,465, filed May 20, 1932.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, a brake pipe and a triple valve device operative upon a reduction in brake pipe pressure to supply fluid under pressure to the brake cylinder to effect an application of the brakes and operative upon an increase in brake pipe pressure to effect a release of the brakes, of quick service means controlled by said triple valve device and operative to effect a local quick service reduction in brake pipe pressure, said quick service means comprising a quick service chamber, valve means operative to vent fluid under pressure from said brake pipe to said quick service chamber, a movable abutment for effecting the operation of said valve means, a communication through which fluid under pressure is adapted to flow from said chamber to the brake cylinder, a valve device operated upon a predetermined increase in brake cylinder pressure for cutting off the flow of fluid from the quick service chamber to the brake cylinder, said triple valve device being operative upon a reduction in brake pipe pressure to supply fluid under pressure to said abutment for operating same, said triple valve device being operative upon an increase in brake pipe pressure to vent fluid under pressure from said abutment, and means controlled by said abutment for venting fluid under pressure from said quick service chamber upon the venting of fluid under pressure from said abutment.

2. In a fluid pressure brake, the combination with a brake pipe, a brake cylinder and a triple valve device operative upon a reduction in brake pipe pressure to supply fluid under pressure to the brake cylinder to effect an application of the brakes and operative upon an increase in brake pipe pressure to effect a release of the brakes, of quick service means controlled by said triple valve device and operative to effect a local quick service reduction in brake pipe pressure, said quick service means comprising a quick service chamber, valve means operative to vent fluid under pressure from said brake pipe to said quick service chamber, a movable abutment for effecting the operation of said valve means, said abutment being open at one side to said quick service chamber and having at the opposite side a chamber, a communication through which fluid under pressure vented to said quick service chamber is adapted to flow, a valve device operated upon a predetermined increase in brake cylinder pressure for cutting off the flow of fluid through said communication, said triple valve device being operative upon a reduction in brake pipe pressure to supply fluid under pressure to the last mentioned chamber for operating said abutment to vent fluid under pressure from said brake pipe, said triple valve device being operative upon an increase in brake pipe pressure to vent fluid under pressure from the last mentioned chamber, and means controlled by the movement of said abutment upon venting fluid under pressure from the last mentioned chamber for venting fluid under pressure from said quick service chamber.

3. In a fluid pressure brake, the combination with a brake pipe and a brake cylinder, of valve means comprising a movable abutment operative by fluid under pressure to connect the brake pipe to the brake cylinder for effecting a local quick service reduction in pressure in said brake pipe, valve means operative upon a predetermined increase in brake cylinder pressure for cutting off the connection from the brake pipe to the brake cylinder, said abutment having a chamber at one side, and a triple valve device comprising a main slide valve, an auxiliary slide valve movably mounted on said main slide valve and cooperative therewith for at one time establishing a communication from said chamber to the atmosphere, said auxiliary slide valve being movable relative to said main slide valve to close said communication and to establish another communication through which fluid under pressure is supplied to said chamber for operating said abutment, and a piston subject to the pressure of fluid in said brake pipe and operative upon a reduction in brake pipe pressure to move said auxiliary slide valve relative to said main slide valve.

4. In a fluid pressure brake, the combination with a brake pipe, of valve means comprising a movable abutment operative by fluid under pressure for effecting a local quick service reduction in pressure in said brake pipe, said abutment having a chamber at one side, and a triple valve device for controlling the operation of said abutment and comprising a casing having a passage communicating with said chamber, and another passage communicating with the atmosphere, a main slide valve movably mounted in said casing and having a port adapted to register with the first mentioned passage, another port adapted to register with the second mentioned passage and a third port open at all times to a supply of fluid under pressure, an auxiliary slide valve movably mounted on said main slide valve and having a cavity adapted in one position of said auxiliary slide valve to connect the two first mentioned ports in said main slide valve, said auxiliary slide valve being movable relative to said main valve to a position in whch said cavity connects the two last mentioned ports in the main slide valve, and a piston subject to the pressure of fluid in said brake pipe and operative upon a reduction in brake pipe pressure to move said auxiliary slide valve.

5. In a fluid pressure brake, the combination with a brake pipe, and a brake cylinder, of valve means comprising an abutment operative by fluid under pressure for effecting a local quick service reduction in brake pipe pressure, said abutment having a chamber at one side, and a triple valve device movable upon a light reduction in brake pipe pressure to a quick service position for supplying fluid under pressure from said auxiliary reservoir to said chamber and movable upon a further reduction in brake pipe pressure to a service position to cut off the supply of fluid under pressure to said chamber and to supply fluid under pressure from said auxiliary reservoir to said brake cylinder, said brake controlling valve device being movable to either a full release position or retarded release position in accordance with the increase in brake pipe pressure for venting fluid under pressure from said brake cylinder to effect a release of the brakes and for venting fluid under pressure from said chamber independently of the venting of fluid under pressure from said brake cylinder.

6. In a fluid pressure brake, the combination with a brake pipe, a brake cylinder, and a chamber communicating with the brake cylinder, of valve means comprising a piston subject on one side to the pressure of fluid in said chamber and having a chamber at the opposite side to which fluid under pressure is supplied for actuating said piston to vent fluid under pressure from said brake pipe to the first mentioned chamber and to said brake cylinder, a check valve for preventing back flow of fluid from said brake cylinder to said first mentioned chamber, a triple valve device operated upon a reduction in brake pipe pressure to supply fluid under pressure to said second mentioned chamber and operated upon an increase in brake pipe pressure to vent fluid under pressure from said second mentioned chamber and from said brake cylinder, and means controlled by said piston for venting fluid under pressure from the first mentioned chamber upon the venting of fluid under pressure from the second mentioned chamber, said piston being operated by fluid under pressure supplied to the second mentioned chamber to close communication through which fluid is vented from said first mentioned chamber.

7. In a fluid pressure brake, the combination with a brake pipe, a brake cylinder, and a chamber communicating with the brake cylinder, of valve means comprising a piston subject on one side to the pressure of fluid in said chamber and having a chamber at the opposite side to which fluid under pressure is supplied for actuating said piston to vent fluid under pressure from said brake pipe to the first mentioned chamber and to said brake cylinder, a check valve for preventing back flow of fluid from said brake cylinder to said first mentioned chamber, valve means for controlling the flow of fluid from the first mentioned chamber to said check valve and the brake cylinder, said valve means being operated upon a predetermined increase in brake cylinder pressure to close the communication from the first mentioned chamber to the brake cylinder, a triple valve device operated upon a reduction in brake pipe pressure to supply fluid under pressure to the second mentioned chamber and to said brake cylinder and operated upon an increase in brake pipe pressure to vent fluid under pressure from said brake cylinder through one atmospheric exhaust port and to vent fluid under pressure from the second mentioned chamber through another atmospheric exhaust port, and a leakage groove adapted to connect the chambers at the opposite sides of said piston upon the venting of fluid from the second mentioned chamber for venting fluid from the first mentioned chamber and from said valve means.

8. In a fluid pressure brake, the combination with a brake pipe, a brake cylinder, and a plurality of chambers communicating with each other and with the brake cylinder, of valve means comprising a piston subject on one side to the pressure of fluid in said chambers and having a chamber at the opposite side to which fluid under pressure is supplied for actuating said piston to vent fluid under pressure from said brake pipe to said plurality of chambers and from thence to said brake cylinder, a triple valve device operated upon a reduction in brake pipe pressure to supply fluid under pressure to the chamber at said opposite side of said piston for actuating said piston, and to supply fluid under pressure to said brake cylinder, said triple valve device being operative upon an increase in brake pipe pressure to establish one communication for venting fluid under pressure from said brake cylinder and another communication through which fluid under pressure is vented from the chamber at said opposite side of said piston, means controlled by said piston for venting fluid under pressure from said plurality of chambers upon the venting of fluid under pressure from the chamber at said opposite side of said piston, a retaining valve device for controlling the venting of fluid under pressure from said brake cylinder and for retaining a predetermined pressure in said brake cylinder, and a check valve for preventing flow of the retained pressure in said brake cylinder to said plurality of chambers.

9. In a fluid pressure brake, the combination with a brake pipe, a brake cylinder and a triple valve device operative upon a reduction in brake pipe pressure to supply fluid under pressure to said brake cylinder to effect an application of the brakes and operative upon an increase in brake pipe pressure to vent fluid under pressure from said brake cylinder to effect a release of the brakes, of quick service means controlled by said triple valve device and operative to effect a local quick service reduction in brake pipe pressure, said quick service means comprising a quick service chamber connected to said brake cylinder, valve means operative to vent fluid under pressure from said brake pipe to said quick service chamber and from thence to said brake cylinder, a movable abutment for effecting the operation of said valve means, said triple valve device being operative upon a reduction in brake pipe pressure to supply fluid under pressure to said abutment for operating same, said triple valve device being operative upon an increase in brake pipe pressure to vent fluid under pressure from said abutment through one atmospheric exhaust port and to vent fluid under pressure from said brake cylinder through another atmospheric exhaust port, means controlled by said abutment for venting fluid under pressure from said quick service chamber upon the venting of fluid under pressure from said abutment, and a check valve for preventing back flow of fluid under pressure from said brake cylinder to said quick service chamber.

10. In a fluid pressure brake, the combination with a brake pipe, of a salvaged triple valve casing having an open ended chamber from which the quick action mechanism has been removed, a cage member inserted in said chamber and secured to said casing and providing a quick service chamber to which fluid under pressure is adapted to be vented from said brake pipe for effecting a local quick service reduction in brake pipe pressure, a valve operative to establish communication through which fluid under pressure is vented from said brake pipe to said quick service chamber, a piston for operating said valve and having a chamber at one side, and means in said triple valve body operative upon a reduction in brake pipe pressure to supply fluid under pressure to said piston chamber for operating said piston and operative upon an increase in brake pipe pressure to vent fluid under pressure from said piston chamber.

11. In a fluid pressure brake, the combination with a brake pipe, of a salvaged triple valve casing having an open ended chamber, including a piston chamber, from which the quick action mechanism has been removed, of a cage member inserted in said chamber and secured to said casing, said cage member having a chamber open to said piston chamber and providing a quick service chamber to which fluid under pressure is adapted to be vented from said brake pipe for effecting a local quick service reduction in brake pipe pressure, said cage member having another chamber open at all times to the brake pipe and adapted to communicate with said quick service chamber, a valve contained in the last mentioned chamber for controlling communication therefrom to said quick service chamber, and adapted to seat on said cage member for closing said communication, a spring for seating said valve, a piston contained in said piston chamber and operative to unseat said valve, a stem carried by said piston and adapted to engage said valve, a gasket carried by said cage member and adapted to be engaged by said piston, and valve means in the triple valve casing operative upon a reduction in brake pipe pressure to supply fluid under pressure to said piston chamber for moving said piston into sealing engagement with said gasket and unseating said valve, said valve means being operative upon an increase in brake pipe pressure to vent fluid under pressure from said piston chamber, and a leakage groove controlled by said piston and operative to vent fluid under pressure from said quick service chamber to said piston chamber upon the venting of fluid from said piston chamber by the operation of said valve means.

12. In a fluid pressure brake, the combination with a brake pipe and a brake cylinder, of a salvaged triple valve casing having an open ended chamber from which the quick action mechanism has been removed, said chamber communicating through a passage with said brake cylinder, a quick service mechanism inserted in said chamber, said mechanism comprising a cage member closing communication from said chamber to said passage and establishing a communication through which fluid is adapted to be vented from the brake pipe to said passage, a valve normally seated on said cage member for closing communication from the brake pipe to said passage, a quick service piston having a stem adapted to engage said valve, and operative by fluid under pressure to unseat said valve, and valve means included in said casing operative upon a reduction in brake pipe pressure to supply fluid under pressure for operating said quick service piston.

13. In a fluid pressure brake, the combination with a brake pipe and a brake cylinder, of a salvaged triple valve casing having an open ended chamber from which the quick action mechanism has been removed, said chamber communicating through a passage with said brake cylinder, a casing section secured to said triple valve casing, said casing section having a passage connected to said brake pipe and a cavity in one face of said casing section open to the brake cylinder passage in the triple valve casing, a quick service mechanism inserted in the chamber of said triple valve casing, said quick service mechanism comprising a cage member secured between the triple valve body and casing section for closing communication from said chamber to said passage and for establishing communication through which fluid under pressure is adapted to be vented from the brake pipe to the brake cylinder, said cage member providing a quick service chamber communicating with said cavity and having a chamber communicating with the brake pipe passage in said casing section, a valve in the last mentioned chamber normally seated on said cage member, a piston operative by fluid under pressure to unseat said valve for venting fluid under pressure from said brake pipe to said quick service chamber and brake cylinder, said piston being open at one side to said quick service chamber and having a chamber at the opposite side to which fluid under pressure is supplied for operating said piston, valve means included in said triple valve casing operative upon a reduction in brake pipe pressure to supply fluid under pressure to the last mentioned chamber and operated upon an increase in brake pipe pressure to vent fluid under pressure from the last mentioned chamber, said piston being operative upon the venting of fluid from the last mentioned chamber to vent fluid under pressure from said quick service chamber, and a check valve in the cavity of said casing section for preventing back flow of fluid under pressure from said brake cylinder to said quick service chamber.

14. In a fluid pressure brake, the combination with a brake pipe and a brake cylinder, of a salvaged triple valve body having an open ended chamber from which the quick action mechanism has been removed, said chamber communicating through a passage with said brake cylinder, a filler section secured to said triple valve body, a quick service mechanism disposed in said chamber, said mechanism comprising a cage member closing communication from said chamber to said passage and establishing a communication through which fluid under pressure is adapted to be vented from said brake pipe to said passage, valve means contained in said cage member and operative upon a reduction in brake pipe pressure to open the last mentioned communication and upon an increase in brake pipe pressure to close the last mentioned communication, a cover section secured to said filler section, communication being established from the quick service valve mechanism to the brake cylinder passage in said triple valve body through said cover section, and valve means contained in said cover section subject at one time to the pressure of fluid in said brake cylinder passage and operative upon a predetermined increase in pressure in said brake cylinder passage to close the communication from said quick service mechanism to said brake cylinder passage.

15. In a fluid pressure brake, the combination with a brake pipe and a brake cylinder, of valve means operated by an increase in fluid pressure for venting fluid from the brake pipe to a quick service chamber, a valve mechanism for controlling the venting of fluid from the brake pipe through said quick service chamber to the brake cylinder, a triple valve device operated upon a reduction in brake pipe pressure to supply fluid under pressure to said valve means and to the brake cylinder and operated upon a subsequent increase in brake pipe pressure to vent fluid from the brake cylinder through one exhaust port and from said quick service chamber through another exhaust port, and a check valve for preventing back flow from the brake cylinder to said quick service chamber.

16. In a fluid pressure brake, the combination with a brake pipe, a brake cylinder, and a quick service chamber, of valve means operated by fluid under pressure for venting fluid under pressure from said brake pipe to said quick service reservoir and to said brake cylinder for effecting a local reduction in brake pipe pressure, a triple valve device operative upon a reduction in brake pipe pressure to supply fluid under pressure for effecting the operation of said valve means and for supplying fluid under pressure to said brake cylinder for applying the brakes, said triple valve device being operative upon an increase in brake pipe pressure to vent fluid under pressure from said valve means and quick service chamber through one exhaust opening, and to vent fluid under pressure from said brake cylinder through another and independent exhaust opening, and valve means controlled by fluid at the pressure in said brake cylinder for closing communication through which fluid under pressure is vented from the brake pipe to the brake cylinder whereby, upon a reduction in brake pipe pressure subsequent to the initial reduction in cycling operation, said valve means prevents venting of fluid from the brake pipe to the brake cylinder and said local reduction in brake pipe pressure is limited to flow of fluid from said brake pipe to said quick service chamber.

CLYDE C. FARMER.